United States Patent [19]
Wiedeck

[11] Patent Number: 5,857,821
[45] Date of Patent: Jan. 12, 1999

[54] SYSTEM FOR LOADING AND UNLOADING RAIL VEHICLES

[75] Inventor: Hans-Norbert Wiedeck, Mülheim, Germany

[73] Assignee: Krupp Fordertechnik GmbH, Duisburg, Germany

[21] Appl. No.: 696,529

[22] Filed: Aug. 14, 1996

[30] Foreign Application Priority Data

Sep. 8, 1995 [DE] Germany .................. 195 33 256.3

[51] Int. Cl.⁶ .................................................. B65G 63/00
[52] U.S. Cl. ........................ 414/334; 414/342; 414/344; 414/392; 414/561; 414/786
[58] Field of Search ................... 414/334, 336–338, 414/340–342, 344, 391, 392, 560, 561, 786, 389; 104/18; 212/324, 325, 326

[56] References Cited

U.S. PATENT DOCUMENTS

| | | | |
|---|---|---|---|
| 1,577,184 | 3/1926 | Fitch | 414/342 X |
| 3,483,829 | 12/1969 | Barry | 104/18 |
| 3,891,100 | 6/1975 | Tamaki et al. | 414/342 |
| 4,027,823 | 6/1977 | Kawarai et al. | 414/392 |
| 4,139,107 | 2/1979 | Ninomiya et al. | 414/392 |
| 5,415,517 | 5/1995 | Lanigan, Sr. et al. | 414/342 X |
| 5,421,688 | 6/1995 | Fuchtey et al. | 414/344 |
| 5,429,469 | 7/1995 | Zimek | 414/392 X |
| 5,609,460 | 3/1997 | Abel et al. | 414/334 |

FOREIGN PATENT DOCUMENTS 0980727  12/1995  Canada ................. 414/392

Primary Examiner—James W. Keenan
Attorney, Agent, or Firm—Herbert Dubno; Andrew Wilford

[57] ABSTRACT

Freight is transferred between a car of a train riding on rails extending in a travel direction and a stationary street vehicle while the train is moving slowly in the travel direction by displacing a grab into a position above the rails, identifying the piece of freight and moving the grab in the travel direction synchronously with the train above the piece of freight on the train, and then engaging the grab with the piece of freight while the grab moves synchronously with the train. The piece of freight is then lifted with the grab off the train and the grab are displaced in a transfer direction transverse to the travel direction while the grab moves synchronously with the train until the piece of freight is clear of the train. Movement of the grab in the travel direction is then arrested and the grab and the piece of freight are moved in the transverse transfer direction and the piece of freight is deposited on a stationary support. The piece of freight is then moved from the support to the street vehicle.

9 Claims, 4 Drawing Sheets

SYSTEM FOR LOADING AND UNLOADING RAIL VEHICLES

FIELD OF THE INVENTION

The present invention relates to a system for loading and unloading rail vehicles, that is trains. More particularly this invention concerns a system for transferring freight between a train and a street vehicle, that is a truck.

BACKGROUND OF THE INVENTION

In order to transfer freight, normally in standard containers, between a rail vehicle on one side and a street vehicle or terminal on the other, it is standard to use a mobile crane system such as described in German patent document 1,556,636 of Lichtenford, 4,332,232 of Schroder, 4,338,121 of Viessmann or the article "Die Krupp-Schnellumschlagenanlage—eine Systemlösung füden Kombinierten Verkehr" by H. Bruckmann (Hebezeuge und Fördermittel, Berlin 34 (1994) 5). These systems transfer the containers between the stationary train and either the depot or the street vehicle.

While such arrangements are relatively effective, they still demand considerable transfer time. The train must be moved in steps through the transfer station and in general the system is cumbersome and slow.

OBJECTS OF THE INVENTION

It is therefore an object of the present invention to provide an improved system for loading and unloading a rail vehicle.

Another object is the provision of such an improved system for loading and unloading a rail vehicle which overcomes the above-given disadvantages, that is which can speedily transfer the freight between the train and street vehicles.

SUMMARY OF THE INVENTION

Freight is transferred between a car of a train riding on rails extending in a travel direction and a stationary street vehicle while the train is moving slowly in the travel direction by displacing a grab into a position above the rails, identifying the piece of freight and moving the grab in the travel direction synchronously with the train above the piece of freight on the train, and then engaging the grab with the piece of freight while the grab moves synchronously with the train. The piece of freight is then lifted with the grab off the train and the grab and the listed piece of freight are displaced in a transfer direction transverse to the travel direction while the grab moves synchronously with the train until the piece of freight is clear of the train. Movement of the grab in the travel direction is then arrested and the grab and the piece of freight are moved in the transverse transfer direction and the piece of freight is deposited on a support. The piece of freight is then moved from the support to the street vehicle.

With this system it is possible in a portion of a train station to load and unload freight while the train is passing at a low speed, e.g. 0.4 m/s to 1 m/s. Some of the freight on the train can be taken off and replaced with new freight. With this arrangement it is possible to mix freight and passenger cars on a train, greatly increasing the flexibility of the transport system.

The grab and lifting device according to the invention rides on rollers on transverse beams. Since for movement of the grab there is only a modest mass to move, it is possible to accelerate it considerably to get it into position.

According to the invention the support is a transfer dolly and the freight is moved by the steps of displacing the transfer dolly with the piece of freight in the transfer direction to a position adjacent a street vehicle and lifting the piece of freight off the transfer dolly and placing it onto the street vehicle.

In accordance with a further feature of this invention another piece of freight is picked off a stationary support with the grab, the grab and this other piece of freight are displaced in the travel direction synchronously with the train and with an empty location on the train car, the grab and the other piece of freight are then displaced in the transverse transfer direction to a position above the empty location while the grab and other piece of freight move synchronously with the train, and the other piece of freight is deposited onto the car at the empty location with the grab while the grab moves synchronously with the train. Then the grab is moved in the transfer travel direction away from the train and arrested in the train travel direction.

Thus according to the invention the same or a different grab can be used to load a new piece of freight onto the train while it is moving through the transfer zone. The stationary support can here be another street vehicle. The other piece of freight is picked off the other street vehicle by the steps of sequentially displacing the grab in the transverse transfer direction into a position above the other street vehicle, identifying the other piece of freight and engaging the grab with it, and lifting the other piece of freight off the street vehicle and displacing the grab and other piece of freight in the transverse travel direction toward the rails. After displacing the grab and the other piece of freight from the street vehicle toward the rails the other piece of freight is deposited on a transfer dolly displaceable in the transfer direction. Then the transfer dolly with the other piece of freight is displaced toward the rails.

The apparatus according to the invention has a crane support extending in a transfer direction transverse to the travel direction between the rails and the street vehicle, a carriage movable in the transfer direction and in the travel direction on the support, and a grab on the carriage. The means for moving the freight from the support to the street vehicle includes a transverse conveyor.

In accordance with this invention the freight has a predetermined length in the travel direction and the crane support includes a pair of horizontal beams extending in the transverse direction and spaced apart in the travel direction by at least twice the length, normally by about 32 m. The freight is moved between the support and the street vehicle by a pair of spaced apart conveyors extending in the transverse transfer direction and means is provided at the ends of the conveyors for transferring the freight to the grab. One of the conveyors is positioned below the other conveyor by a spacing equal at least to a height of the freight and the transfer means is a lift or elevator.

Normally according to the invention the crane support includes a pair of horizontal beams extending in the transverse direction and spaced apart in the travel direction. A pantograph wire extends above the rails in the travel direction, and a support extends between the beams and carries the wire. The support and wire are displaceable in the transfer direction out of the way of the grab. The wire can be interrupted between the beams.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
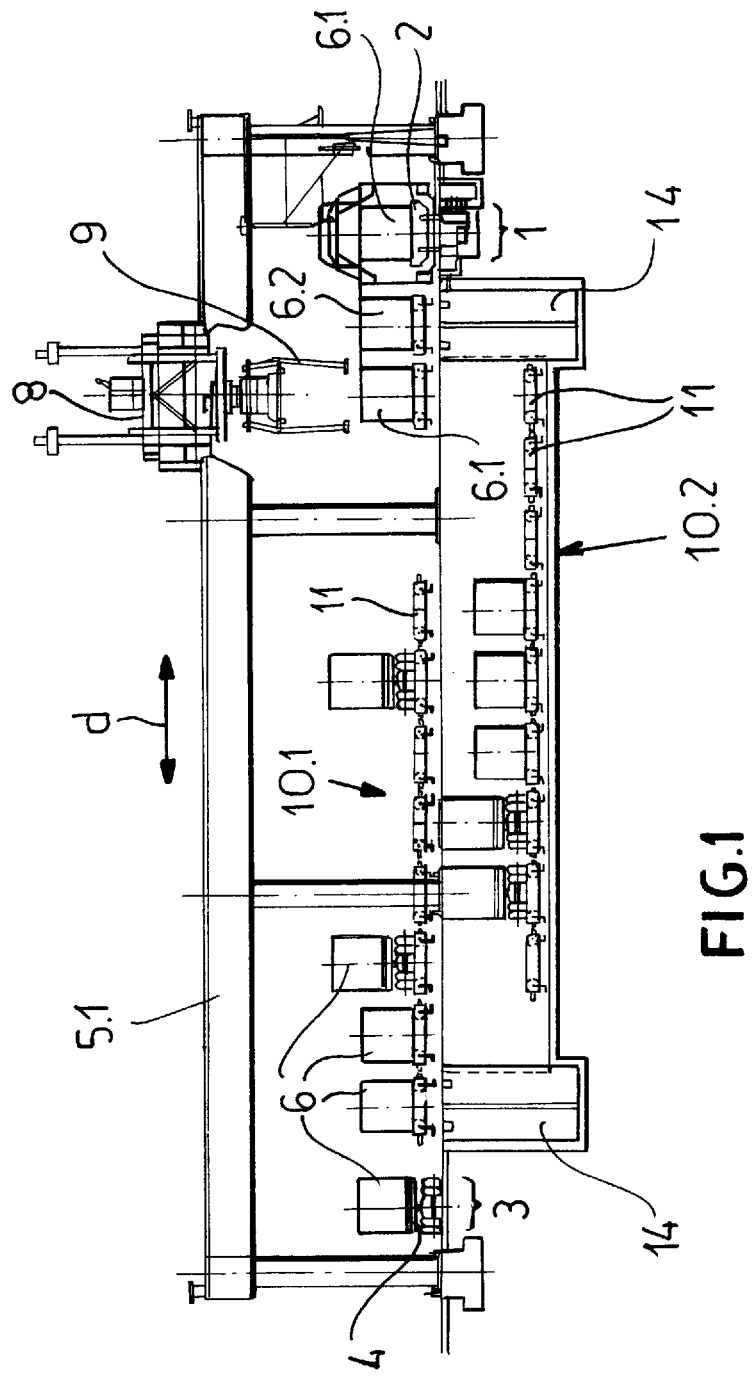
FIG. 1 is a small-scale schematic end view of the system of this invention.
Figure 2:
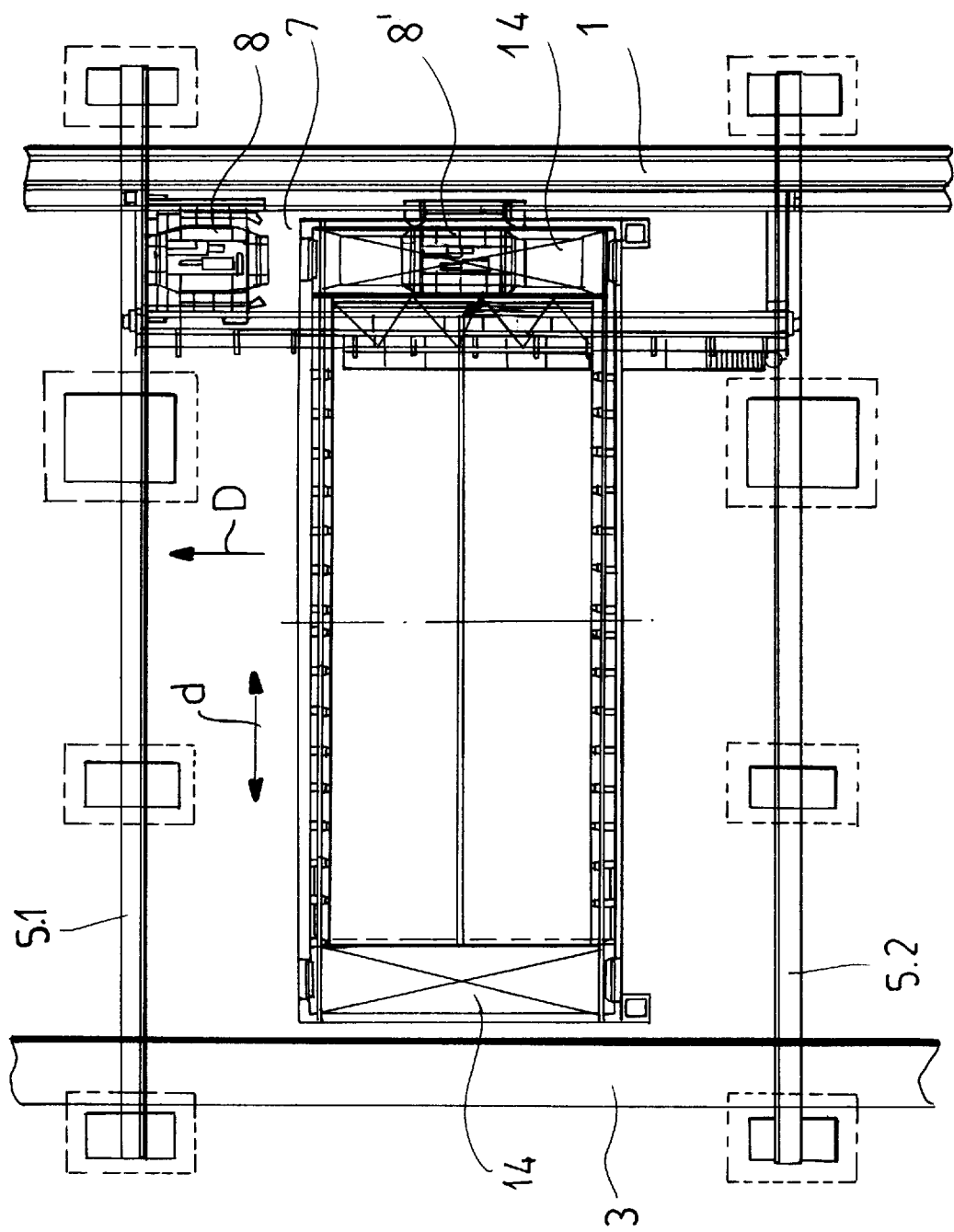
FIG. 2 is a top view of the system of FIG. 1.
Figure 3:
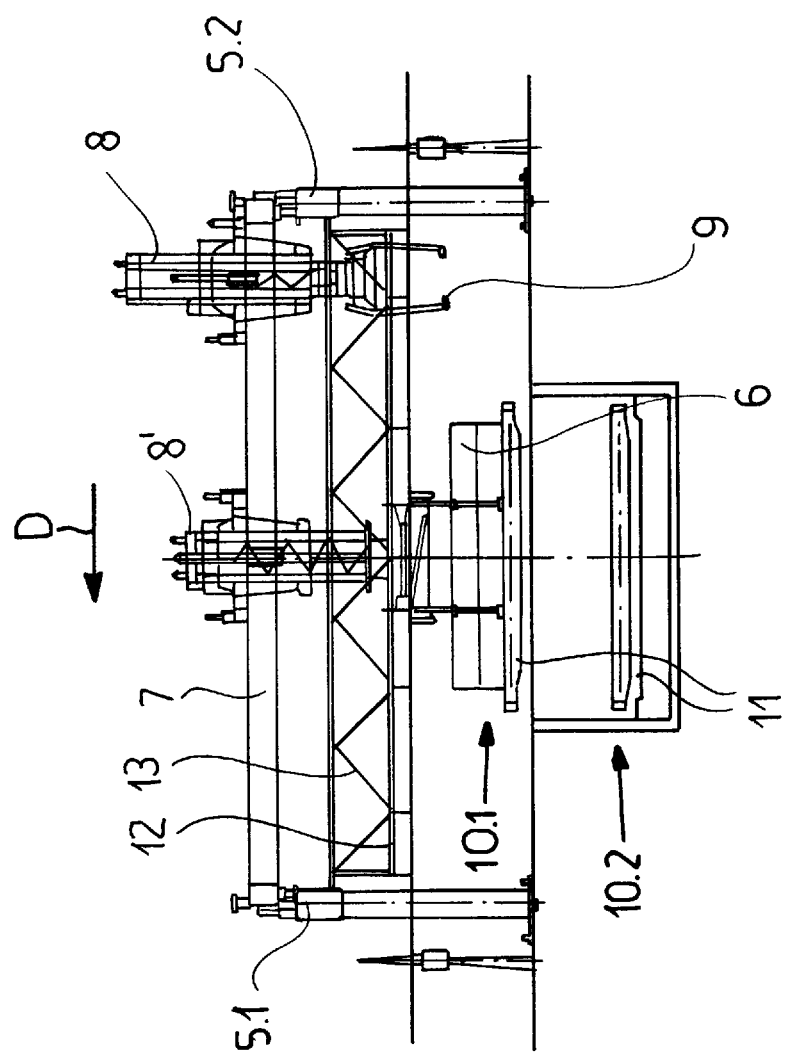
FIG. 3 is a side view of the FIG. 1 system.

As seen in FIGS. 1 through 3, rails 1 support a train of cars 2 movable in a main travel direction D and a street 3 extending in this direction D supports street vehicles here illustrated as a truck trailer 4. A support constituted as a pair of parallel beams 5.1 and 5.2 extending in a transverse transfer direction d are spaced apart in the direction D by about 32 m and carry a main carriage 7 that can therefore move in this direction d. A secondary carriage 8 can move on the main carriage 7 in the direction D and carries a grab 9 of standard construction intended to engage and pick up pieces 6, 6.1, and 6.2 of freight which are of standardized size, for instance 40-ft (13-m) containers.

Figure 4:
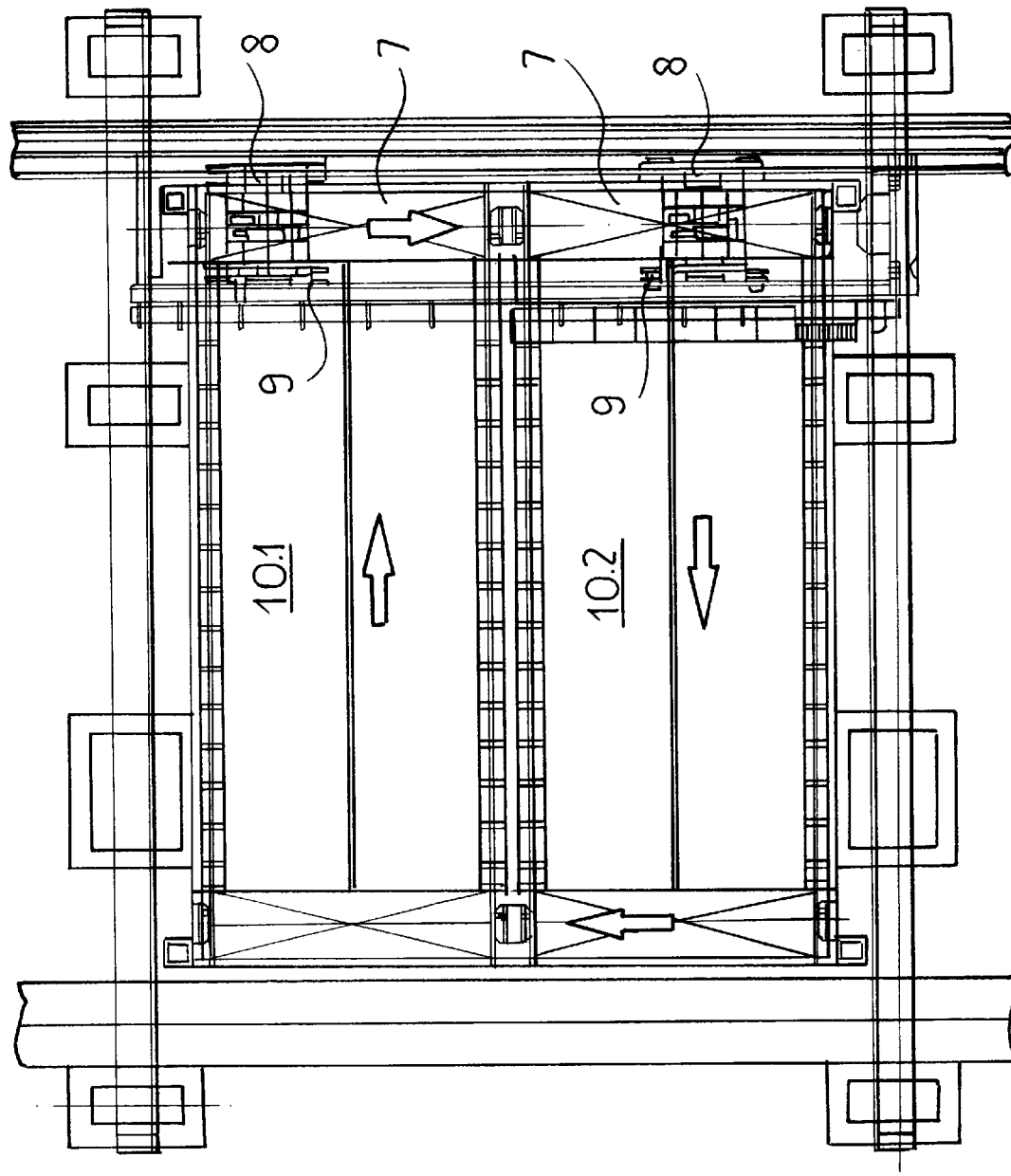
FIG. 4 is a view like FIG. 2 of an alternate arrangement according to the invention.

Underneath the support beams 5.1 and 5.2 are an upper and a lower conveyor 10.1 and 10.2 each provided with a plurality of dollies 11 capable of moving from one end to the other. Lifts 14 are provided at the ends of the conveyors 10.1 and 10.2 for switching the dollies 11 and anything they carry from the lower to the upper level, making it possible to sort freight as it moves back and forth between the rails 1 and street 3. In FIG. 4 the two conveyor systems 10.1 and 10.2 are situated horizontally next to each other and there are two separate carriages 7 and 8 with grabs 9 to allow faster unloading and unloading.

The unillustrated locomotive that moves the train cars 2, normally at a speed between 0.4 m/sec and 1 m/sec, is powered by a pantograph wire 12 carried on a deflectable support 13. This wire 13 can be pushed completely out of the way once the locomotive has gone through, so that it is interrupted and does not interfere with the loading and unloading operations.

With this arrangement as the cars 2 move slowly in the direction D through the transfer zone bounded by the beams 5.1 and 5.2, the rails 1, and the street 3, the wire 12 is moved out of the way and the grab 9 is positioned above the tracks 1 at the upstream (relative to direction D) end of the zone. The freight 6.1 to be unloaded is identified, for instance by a big bar code printed on its container, and the grab 9 is moved downstream in the direction D above it at the same speed and is closed on the selected freight. The freight 6.1 is lifted off the car 2 and moved in the direction d out of the path of the train, that is from above the tracks 1, and the grab 9 and its picked-up freight are moved back from the position shown at 8 in FIG. 2 to the position shown at 8', whereupon the freight is dropped on a dolly 11 which can transport it away.

The grab 9 can then seize another piece 6.2 of freight and, after synchronizing speed with the train, drop it into an empty location on a car 2.

At the street side the grab 9 or a separate such device can be used to take freight 6 off the trucks 4 and place it on dollies 11 or vice versa.

I claim:

1. A method of transferring freight between a car of a train riding on rails extending in a travel direction and a stationary street vehicle, the method comprising, while the train is moving slowly in the travel direction, the steps of sequentially:

a) displacing a grab into a position above the rails;

b) moving the grab in the travel direction synchronously with the train above a piece of freight on the train;

c) engaging the grab with the piece of freight while the grab moves synchronously with the train;

d) lifting the piece of freight with the grab off the train and displacing the grab in a transfer direction transverse to the travel direction while the grab moves synchronously with the train until the piece of freight is clear of the train;

e) arresting movement of the grab in the travel direction;

f) displacing the grab and the piece of freight in the transverse transfer direction and depositing the piece of freight on a support and then moving the support transversely of the travel direction away from the train to a position adjacent the street vehicle;

g) moving the piece of freight from the support to the street vehicle by displacing the support with the piece of freight in the transfer direction to a position adjacent a street vehicle and then lifting the piece of freight off the support and placing it onto the street vehicle with the grab;

h) picking up another piece of freight off another support with the grab;

i) displacing the grab and the other piece of freight in the travel direction synchronously with the train and with an empty location on the train car;

j) displacing the grab and the other piece of freight in the transverse transfer direction to a position above the empty location while the grab and other piece of freight move synchronously with the train;

k) depositing the other piece of freight onto the car at the empty location with the grab while the grab moves synchronously with the train;

l) displacing the grab in the transfer travel direction away from the train while the grab moves synchronously with the train; and m) arresting movement of the grab in the train travel direction.

2. The freight transfer method defined in claim 1 wherein the support of step h) is another street vehicle, the other piece of freight being picked up off the other street vehicle in step h) by the steps of sequentially:

displacing the grab in the transverse transfer direction into a position above the other street vehicle;

engaging the grab with the other piece of freight; and lifting the other piece of freight off the street vehicle and displacing the grab and other piece of freight in the transverse travel direction toward the rails.

3. The freight transfer method defined in claim 2, further comprising, after displacing the grab and other piece of freight from the street vehicle toward the rails, the step of depositing the other piece of freight on a transfer dolly displaceable in the transfer direction.

4. The freight transfer method defined in claim 3 further comprising, after depositing the other piece of freight on the transfer dolly, the step of displacing the transfer dolly with the other piece of freight toward the rails.

5. An apparatus for transferring freight between a car of a train riding on rails extending in a travel direction and a stationary street vehicle while the train is moving slowly in the travel direction, the apparatus comprising:

a crane support extending in a transfer direction transverse to the travel direction between the rails and the street vehicle, the freight having a predetermined length in the travel direction and the crane support including a pair of horizontal beams extending in the transverse direction and spaced apart in the travel direction by at least twice the length;

a main carriage movable in the transfer direction on the support;

a secondary carriage movable in the travel direction on the main carriage;

a grab on the secondary carriage;

means for displacing the grab in the transverse direction into a position above the rails and for moving the grab in the travel direction synchronously with the train above the piece of freight on the train;

means connected to the carriages and to the grab for engaging the grab with the piece of freight while the grab moves synchronously with the train;

means for lifting the piece of freight with the grab off the train and displacing the grab in a transfer direction transverse to the travel direction while the grab moves synchronously with the train until the piece of freight is clear of the train, for arresting movement of the grab in the travel direction, and for displacing the grab and the piece of freight in the transverse transfer direction and depositing the piece of freight on a support; and means including a pair of spaced apart and oppositely effective conveyors extending in the transverse transfer direction for moving the piece of freight from the support to the street vehicle.

6. The freight-transfer apparatus defined in claim 5 wherein one of the conveyors is positioned below the other conveyor by a spacing equal at least to a height of the freight and the means for moving the freight from the support to the street vehicle includes means at the ends of the conveyors for raising and lowering the freight to the grab.

7. The freight-transfer apparatus defined in claim 5 wherein the crane support includes a pair of horizontal beams extending in the transverse direction and spaced apart in the travel direction, the apparatus further comprising a pantograph wire extending above the rails in the travel direction; and a support extending between the beams and carrying the wire.

8. The freight-transfer apparatus defined in claim 7, further comprising means for displacing the support and wire in the transfer direction out of the way of the grab.

9. The freight-transfer apparatus defined in claim 7 wherein the wire is discontinuous between the beams.

* * * * *